(12) United States Patent
Simhoni

(10) Patent No.: US 9,639,924 B2
(45) Date of Patent: May 2, 2017

(54) ADDING OBJECTS TO DIGITAL PHOTOGRAPHS

(71) Applicant: Noa Simhoni, Rehovot (IL)

(72) Inventor: Noa Simhoni, Rehovot (IL)

(73) Assignee: SEEMSOME EVERYONE LTD, Rehovot (IL)

( * ) Notice: Subject to any disclaimer, the term of this patent is extended or adjusted under 35 U.S.C. 154(b) by 0 days.

(21) Appl. No.: 14/430,261

(22) PCT Filed: Sep. 24, 2013

(86) PCT No.: PCT/IL2013/050801
§ 371 (c)(1),
(2) Date: Mar. 23, 2015

(87) PCT Pub. No.: WO2014/045289
PCT Pub. Date: Mar. 27, 2014

(65) Prior Publication Data
US 2015/0221074 A1 Aug. 6, 2015

Related U.S. Application Data

(60) Provisional application No. 61/705,086, filed on Sep. 24, 2012.

(51) Int. Cl.
G06K 9/00 (2006.01)
G06T 5/50 (2006.01)
G06T 19/00 (2011.01)
G06T 19/20 (2011.01)
H04N 5/265 (2006.01)

(52) U.S. Cl.
CPC .............. *G06T 5/50* (2013.01); *G06T 19/006* (2013.01); *G06T 19/20* (2013.01); *H04N 5/265* (2013.01); *G06T 2207/10028* (2013.01); *G06T 2207/20092* (2013.01); *G06T 2207/20221* (2013.01); *G06T 2219/2008* (2013.01)

(58) Field of Classification Search
None
See application file for complete search history.

(56) References Cited

U.S. PATENT DOCUMENTS

2003/0009664 A1* 1/2003 Stephany .......... G06K 9/00335
713/168
2010/0289817 A1* 11/2010 Meier .................... G06T 15/20
345/619

\* cited by examiner

*Primary Examiner* — Fred Hu
(74) *Attorney, Agent, or Firm* — Leber IP Law

(57) ABSTRACT

A system and method for enhancing digital photographs by enabling end-users to add 3D objects to digital photographs. The end-user can select a 3D object from a library, place the 3D object on the digital photograph and then manipulate the 3D object to customize it to its taste. The 3D object can be directly manipulated by the end-user and the end-user can create an infinite number of object variations, in contrast to systems of the art where an end-user can only select object variations from a given number of preloaded object variations. The modified digital photograph can then be shared by the user in one or more social networks.

12 Claims, 10 Drawing Sheets

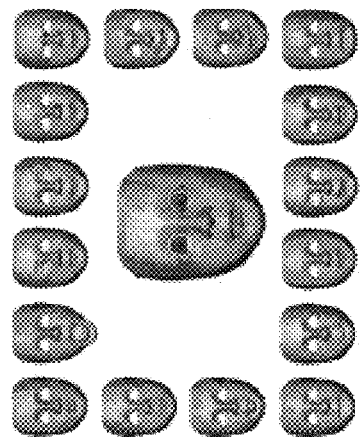
Fig. 18
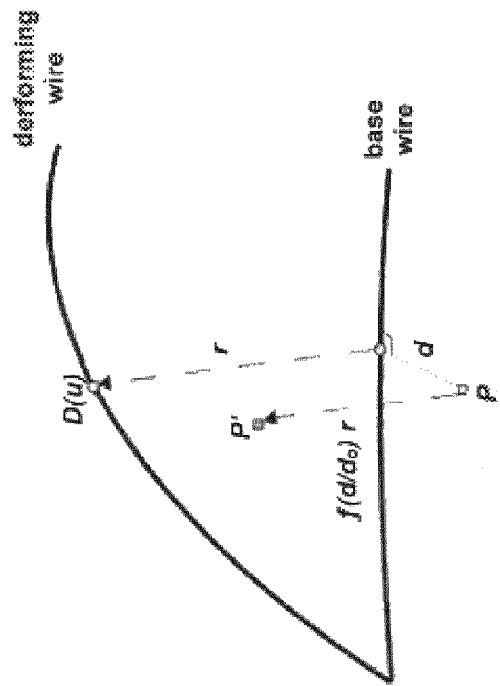
Fig. 17
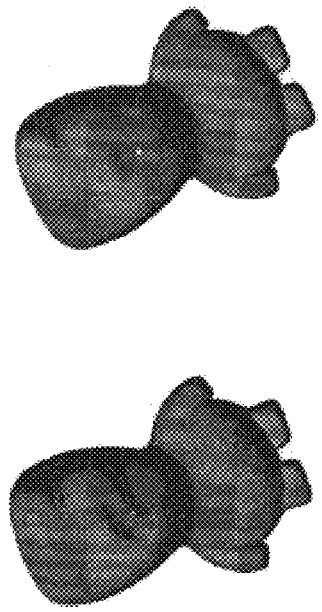
Fig. 19 A
Fig. 19 B

Fig. 21 B

- 430 — Connects a locator to each one of the clusters via MEL script
- 440 — Translating the above set-up into a multi-paradigm code system
- 450 — Exporting the above setup methodology to a format that can be used in the target programming
- 460 — Creating a separate module for each of the tasks: modeling, animation, renderfarm etc'
- 470 — Specifying the attributes of each vertex
- 480 — Defining the array attribute of the wire
- 490 — Importing the wire deformers from the index
- 500 — Importing all of the related strings as a storage folder with the string name

ADDING OBJECTS TO DIGITAL PHOTOGRAPHS

TECHNICAL FIELD

The present invention relates to digital photography in general, and in particular to a system and method for adding three-dimensional (3D) objects to digital photographs.

BACKGROUND ART

Digital photography and in particular photos taken with a smartphone has contributed to a proliferation of digital photos taken daily by many people. One of the most popular ways for people to share the photos they take is by using social media applications. Millions of photos are loaded daily to social networks, to be shared by the users' online friends and connections or to be shared publicly.

In some cases, a user may wish to share more than a simple picture of his surroundings, for example, to express a pertinent thought, association, observation or any other feedback related to the picture taken. It is possible today to add a text commentary to a picture though text may not always be the optimal way to express a user's association or thought related to the picture.

There is thus a need to enable users enhance a digital photographs with visual objects that can express the user's thoughts associated with that picture. The modified photographs (together with the added objects) should be made available immediately to be loaded on social networks so that the user can share the modified photograph with his friends or with the public. It could be useful to enable users to use a visual language via selected objects so that users can express themselves non-verbally.

SUMMARY OF INVENTION

It is an object of the present invention to enable users to add objects to digital photographs.

It is a further object of the present invention to enable users to add 3D objects to digital photographs.

It is another object of the present invention to enable users to modify and manipulate the objects added to digital photographs.

It is yet a further object of the present invention to enable users to easily share the modified photographs on social networks.

The present invention thus relates to a computerized system comprising a processor and memory for adding three-dimensional (3D) objects to digital photographs, the system comprising:

(i) a photograph selection module for selecting a digital photograph stored in a digital photographs memory;

(ii) a plurality of 3D objects in a 3D objects library, each of said 3D objects comprising:
 a) a skeleton;
 b) wire deformers attached to said skeleton;
 c) a main cluster attached to said skeleton;
 d) a plurality of secondary clusters, each secondary cluster attached to said skeleton and also attached to at least one wire deformer;

(iii) a 3D object selection module for selecting a 3D object from said 3D objects library;

(iv) a merging module for merging the selected 3D object with the selected photograph; and (v) a 3D object manipulation module for selecting and modifying at least one of the 3D object's placement, size, orientation, angle, rotation, color, shape, deformation, expression, shading, lighting, erasing part of the object, applying a digital filter to the object on top of the selected photograph thus creating a modified photograph showing the selected object.

In some embodiments, the system resides in a mobile telephone, a tablet computer, a laptop computer or a personal computer, a server or any combination thereof.

In some embodiments, the digital photograph library is composed of 3D objects and the description information that describes the objects in the library.

In some embodiments, the digital photograph library resides in a mobile telephone, a tablet computer, a laptop computer, a personal computer, on a storage location accessible via the Internet or any combination thereof.

In some embodiments, the digital objects library resides in a mobile telephone, a tablet computer, a laptop computer, a personal computer, on a storage location accessible via the Internet or any combination thereof.

In some embodiments, the object is a 2-Dimensional (2D) or a 3-dimensional (3D) digital object.

In some embodiments, the object is a photograph, a graphic, text or any combination thereof.

In some embodiments, the object manipulation module modifies one or more of the following parameters: object color, object shading, object lighting, object expression, object angle, object rotation, object texture erasing part of the object, applying a digital filter to the object, adding text anywhere on the selected photograph, object deformation or any combination thereof.

In some embodiments, the digital filter comprises, changing the object lighting effect eliminating one or more colors from the object, changing one or more colors of the object, integrating text to the object texture, making the object or part of the object become partially transparent or any combination thereof.

In some embodiments, the modified photograph is shared via one or more social media networks, email messages, instant-messages networks, any other available networks or any combination thereof.

In some embodiments, the invention includes a social module that enables users to view a modified photograph that is shared by other users in the same social network.

In some embodiments, the social module enables users to view a modified photograph that is shared by other users and created at a near location.

In some embodiments, the social module includes a relationship algorithm that defines the relationship between users based on the amount and frequency of the interaction between them. For example, if a first user shares a modified picture with a second user and the second users shares a modified picture with the first user once, the first and second users relationship is defined as level one. If the first and second users exchange modified pictures N time their relationship is defined as level N. If the first and second users exchange more modified pictures in a specific time frame, their relationship level is increased and if the first and second users do not share modified pictures in a specific time frame their relationship level is reduced.

In some embodiments, the social module displays to users modified pictures are created by other users based on the relationship level between the users. The modified pictures are sorted based on the relationship level.

In some embodiments, the object selection module displays the objects sorted by one or more criteria such as the objects that are used by users that have a relationship with the user and the relationship level.

In some embodiments, the modified photograph is first uploaded to a server and then the server shares the modified photograph with one or more social media networks.

In some embodiments, the method of the invention is applied and packaged in a Software Development Kit (SDK) to be used in the development of 3$^{rd}$-party software applications that integrate the method of the invention.

In some embodiments, the object selection module comprises filtering the available objects with at least one of object name, object category, object sub category, keyword. In some embodiments, the object manipulation module comprises deformation of a 3D object by reshaping the selected object.

In some embodiments, the object selection module includes a prioritization function that sort the objects presented to the user based on at least one of the user interests as provided by the social networks and/or user previous objects selections.

In some embodiments, the prioritization module displays the objects to the user based on the user geographic location. The geographic location information can include information the country, city, neighborhood, street and also any specific establishment the user is located in such as hotel, restaurant, school, theater, shopping mall, park, beach etc.

In some embodiments, the application of the invention adds to the modified picture an indication of the location where the photo was taken. For example, if the photo was taken at a coffee shop, the coffee shop name and/or logo is automatically displayed on the picture. In some embodiments, the invention includes a management module where businesses can add their logo so it is automatically included in pictures taken in their business locations.

In some embodiments, the invention includes a user generated content (UGC) module that allows users to upload modified objects so those objects can be used by other users.

In some embodiments, the user can also add any text to the object. Such text can be transformed into part of the object texture, thus appearing on the object itself.

In another aspect, the present invention relates to a computerized method for adding 3D objects to digital photographs, the method comprising the steps of:

(i) selecting a digital photograph stored in a digital photographs library;

(ii) creating a plurality of 3D objects and placing them in a 3D objects library, each 3D object comprising:

a) a skeleton;

b) wire deformers attached to said skeleton;

c) a main cluster attached to said skeleton;

d) a plurality of secondary clusters, each secondary cluster attached to said skeleton and also attached to at least one wire deformer;

(iii) selecting an object from a said 3D objects library;

(iv) merging the selected object with the selected photograph; and (v) selecting and modifying at least the object's placement and size in the selected photograph thus creating a modified photograph showing the selected object.

BRIEF DESCRIPTION OF DRAWINGS

" (FIG. 9B).

FIG. 17 is a graph showing the wire deformer as completely specified by two curves of equal parametric range (a base wire and a deforming wire).

FIG. 18 displays an example of blend shapes images of a 3D object.

FIGS. 19A-19B display an example of an object of the art with deformation problems (FIG. 19A) and in contrast an object of the invention without deformation problems.

MODES FOR CARRYING OUT THE INVENTION

Figure 3:
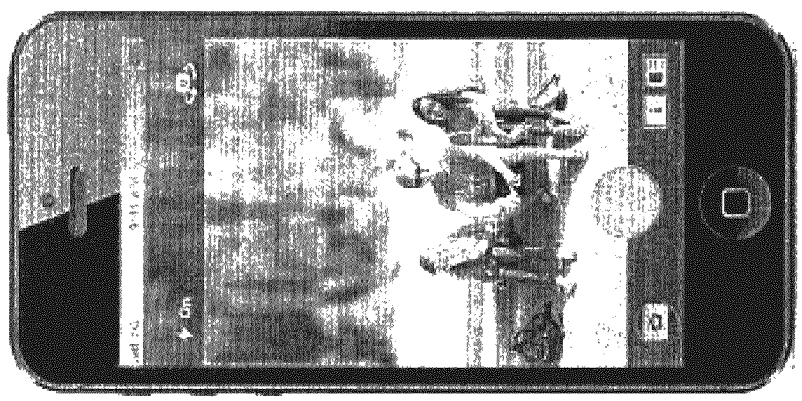
FIG. 3 is a screen shot showing making a selection to add a 3D object from the 3D object library.

In the following detailed description of various embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

The present invention relates to computerized system for adding graphical objects to digital photographs. The digital photographs can be photographs taken by the user with his smartphone or digital camera or any other photographs residing either on a user device (telephone, computer, tablet, laptop, media center, Kinect™ and the like) and/or a digital storage location available on a device or through the Internet (or via any other data network). When the user wishes to take a photo of his surroundings, add an object and share it with his friends, the most convenient tool today is a smartphone or tablet though the invention encompasses using any other device including but not limited to a personal computer, a laptop computer, a digital camera equipped with data connection and editing capabilities etc.

For simplifying the disclosure, we will describe the invention as used by a user using his smartphone, though the invention covers the same usage through any other user device such as tablet, personal computer, laptop computer etc.

In one typical scenario, a user takes a picture with his smartphone or camera and has a pertinent association he wishes to express and share with his friends (and/or with the public). The term "friends" as used herein in the digital sharing context should be interpreted as anybody the user allows to view the picture from a predefined list to the general public. For example, the user has taken a photograph of a person with a hair style resembling a sheep. Posting such a photo with a text mark "doesn't the hair look like a sheep" will not have the same effect as posting a photo of that person alongside a sheep image or 3D object, for many reasons. A viewer will first see the photo and only afterwards see the text thus the photo won't have an immediate effect; a viewer might not read the text associated with the photo; in some instances, the text might not be immediately visible alongside the picture; a viewer might not understand the language of the text etc.

The user thus starts by using the photograph selection module for selecting a digital photograph. The selected photograph can be a picture the user just took or alternatively, the photograph selection module allows the user to browse photographs both on his device and on outside locations such as Internet sites. The final photograph chosen can be a photograph taken by the user or a photograph taken by somebody else.

The user then proceeds to use the object selection module of the invention for selecting an object from a digital objects library. The digital object library can be located on one or more locations. For example, the user may browse digital objects stored on his device, stored on a server of the invention or stored on any other location or device by the user or by a third party.

The information describing the library of objects may reside on one or more physical and/or virtual locations and organized in any storage facility including on but not limited to a database or file sharing server. The following Table 1 is an illustration of an example database that contains information about the objects:

TABLE 1

Database organization

| Id | Name | Category | Sub-category | Path |
|---|---|---|---|---|
| 100 | Crazy Cat | Animal | Cat | http://www.seemsome.com/objs/100.obj |
| 101 | Black Cat | Animal | Cat | http://www.seemsome.com/objs/101.obj |
| 102 | White dog | Animal | Dog | http://www.seemsome.com/objs/102.obj |

The first field "Id" is a unique identifier of the object. Each object has a unique "id" field that uniquely identifies the object. The second field "Name" is the object name that is used to describe the object when listing the objects in the object selection module. The third field "Category" is the category where the object is listed in the object selection module. The fourth field "Sub category" is the sub category of the object where the object is listed in the object selection module. The fifth field "Path" is the location of the object, for example, on a web server. The object can be retrieved from that path when the user selects the object in the object selection module. The objects database can be implemented in many ways and is not limited to this example. The objects database may include different set of fields and the illustration is an example illustration. A database may be physically and/or virtually distributed among one or more physical and/or virtual location. A virtual location may be, for example, when one physical storage facility (a hard drive, a server) is divided into multiple virtual units, each addressable separately and having its own functions and permissions. For example, one physical disk drive can be divided into 5 virtual disk units A to E, thus from a user perspective each disk unit A to E is a separate entity.

The selection of an object can be implemented in many different ways, all of them included in the invention. For example, the selection may go through category selection for faster access. A user might first choose "nature" as a first category, then inside nature select the "animal" category. Inside "animal" the user might select "predator" and then "tiger". In the "tiger" category, several types of tigers can be presented so that user can choose the one the fits the best to his choice. There can be further sub-categories, for example, white tiger, cute tiger, less-cute tiger, angry tiger, very angry tiger, fat tiger etc. It is possible to search by category only, category and sub-category (or sub-categories). It is also possible to include one or more keywords to describe the searched object. For example, angry tiger may yield several results angry, angry and fat, angry and white etc. The user can search a 3D object by any combination of categories, sub-categories and keywords describing the object.

UGC allows users to upload 3D objects and tag them by category, subcategory and name. These objects can automatically enter the library of objects.

Objects can be linked to external locations. For example, objects representing commercial products can be linked to the manufacturer's site, thus clicking on the commercial object can bring the user to the home page of that product or to any other related page.

In some embodiments, when selecting an object, a user can see other users that have also used that object and also see modified photographs with that object. So an analysis can be performed based on people selecting the same object.

In some embodiments, the user browses through 2D images of objects and selects a desired object. Once the user selects a figure, a 3D representation of that object is fetched so that it can be merged with the selected photograph and manipulated accordingly. The 3D object can be fetched either locally from an internal object library on the user device or from an external object device accessible via the Internet or any data connection.

The object selection can occur through both visual and/or search mechanisms. A user is able to select categories and then visually inspect the objects of that category and select one. In some embodiments, objects in the library are each defined by one or more keywords and the user might use a keyword search in order to identify particular objects.

Once the user has selected a digital object, the merging module of the invention is used for merging the selected object with the selected photograph. Typically, the object is merged on top of the photograph as an additional layer.

In some embodiments, the user first selects an object which is made visible on the screen and then the user proceeds to take a picture with his smartphone, having the object already positioned in the screen. A virtual reality system surveys a real-world environment, generates 3D data that defines the real-world environment, renders a virtual 3D environment using the 3D data, retrieves a 3D object from an object library, renders the 3D object in the virtual 3D environment, and re-positions the 3D object in the virtual 3D environment. The invention thus also encompasses uses of virtual reality or augmented reality by combing the 3D object with the surroundings as captured by the camera (typically the camera of a smartphone).

There are several ways of merging an object (3D or 2D) with a photograph (2D). In some embodiments, the 2D photograph is stored as a lower layer upon which a 3D layer with the object is placed. The user manipulates the 3D object and when he is satisfied, the 3D object layer is translated to a 2D layer and the two 2D layers are then merged (composed) to form a final single 2D layer, for example, in the JPEG format. A single 2D layer is smaller in size than a photograph with an additional 3D layer, thus it's more convenient to store and faster to transmit.

In some embodiments, the modified photograph can include the original photograph 2D layer and the 3D object layer. This format although larger in size, presents the advantage that the 3D object can be further manipulated if necessary. In the previous example of a single, finalized 2D layer, the original object cannot be manipulated again, as the information defining the 3D object shape is lost in the transformation of the object to 2D.

In some embodiments, the modified photograph can include the original photograph 2D layer and the 3D object description layer. The 3D object description layer is information that describes the object identification, object manipulation, location on the screen, size, orientation, angle and any other parameter that describes the manipulation of the object. When there is a need to display the object, the object is retrieved using the object identification ("Id" field in Table-1) and this way this format does not require transferring the actual object and the format size is smaller. Simply merging an object with a photo is not enough since the user needs to control several parameters related to the merged object in order to create a modified photograph to his taste. Next, the object manipulation module of the invention is used for selecting and modifying at least the object's placement and size in the selected photograph thus creating a modified photograph showing the selected object.

The system of the invention can be implemented in one or more devices/machines. For example, an independent application can resides in a user's mobile telephone, tablet computer, laptop computer or personal computer. Alternatively, any module of the system can be placed on a server accessible by the user device.

The digital photograph library encompasses one or more storage locations for digital photos. These storage locations can reside in a mobile telephone, a tablet computer, a laptop computer, a personal computer, on a storage location accessible via the Internet or any combination thereof. For example, the digital photograph library can include photos the user has on his mobile phone, his personal computer, user photos stored on social networks and other data sharing networks, digital photos offered by $3^{rd}$ parties or any combination thereof.

Similarly, the digital objects library can reside in a mobile telephone, a tablet computer, a laptop computer, a personal computer, on a storage location accessible via the Internet or any combination thereof. For example, a user may have limited number of objects stored on his device while being able to remotely access a larger number of digital objects, for example, via an Internet or data connection.

For best results, the digital objects are 3-dimensional (3D) digital objects, so that the objects can be creatively manipulated, for example, rotated. It is also possible to use 2-Dimensional (2D) objects or a combination of 2D and 3D digital objects.

A digital object can be a photograph, a graphic, text or any combination thereof.

The object manipulation module of the invention can add artistic effects to the object. The object manipulation module can modify one or more of the following parameters: object color, object shading, object lighting, object expression, object angle, object rotation, erasing part of the object, applying a digital filter to the object, adding text anywhere on the selected photograph, object deformation or any combination thereof.

The object manipulation is preferably performed for a 3D-object. The user is able to perform actions such as scaling, rotating and translation on a 3D object, manipulating the 3D object in the XYZ axis. The user manipulation can be via a touch screen and/or a pointing device such as a mouse, stylus or similar technologies.

Some manipulations such as erasing part of the object require first transforming the 3D object to a 2D object and then erasing portions of the 2D object. For example, when a user wishes to erase part of an object, the 3D object is transformed to a 2D object, in a separate layer on top of the 2D photograph layer. When in "erase mode" the now 2D object can be transformed to a semitransparent state (say 50% transparency) so that a user can view the parts that are erased. The 2D object cannot be further manipulated, for example, scaled or moved. Any such operation will return the object to its former 3D state, practically "undoing" the erase action.

Object expression relates to making the object, whether a person, an animal or an article, express emotions such as happiness, sadness, anger, confusion and the like. For example, a dial (a wheel or any other User Interface tool) positioned in the center can signify a neutral expression, while moving (dragging) the dial to the right makes the object have a more positive emotion and moving the dial to the left makes the object have a more negative expression. For example, the neutral position can show a person (or a dog or a car) with a neutral expression, while moving the dial to the right will show the person (or dog or car) looking happier while pushing the dial to the left will show the person (or dog or car) looking angrier.

Object deformation relates to changing the object shape dynamically and without limiting the user to use only the expressions that are prepared in advance (as described in manipulating object expression). Reshaping the object can be intuitive allowing the user to select a point on the object (via a touch screen and/or a pointing device such as a mouse, stylus or similar technologies) and then moving the selected point in any direction will reshape the object. Object deformation allows the user a very flexible way to express himself by intuitively reshaping the image as desired.

One of the primary motivations of a user to add an object to a photograph is to express himself and share the modified photograph with his friends or with the public. One of the most common sharing options today is to share the modified photograph in one or more social media networks, email message, instant messaging networks, chat or any other mean to share the picture apparent to a person skilled in the relevant art(s) and referred herein as "social networks".

Instead of uploading the modified photograph to a plurality of sharing sites one at a time, one efficient alternative is to upload the modified photograph once to a server of the invention and then the server shares the modified photograph with one or more social media networks per the user's preferences and instructions.

In some embodiments, the modified photograph is first stored at the user device where it was created. When the user desires (immediately after saving or at any later point) the modified photograph can be uploaded to one or more social networks. The user can define by whom the modified photograph can be seen: only himself, a predefined list or category of friends, anybody etc.

In some embodiments, users of the system of the invention share a social network of the invention. Each user can store his modified photographs on his account. For users who choose to share their modified photographs with their online friends or the public, it is possible to search other users by matching selected objects. For example, a user might search for all users that have also selected the "Eifel Tower" for modified photographs, and thus the user is able to see how other users have performed creatively with the same object.

Figure 1:
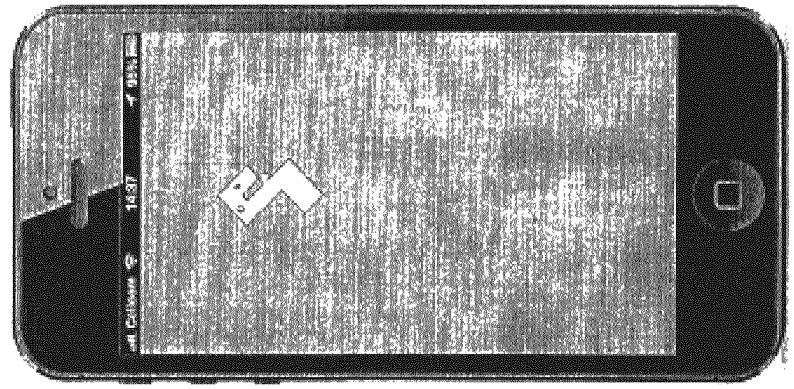
FIG. 1 is a screen shot showing an embodiment of a splash screen of an application of the invention.

FIG. 1 is a screen shot showing an embodiment of a splash screen of an application of the invention.

Figure 2:
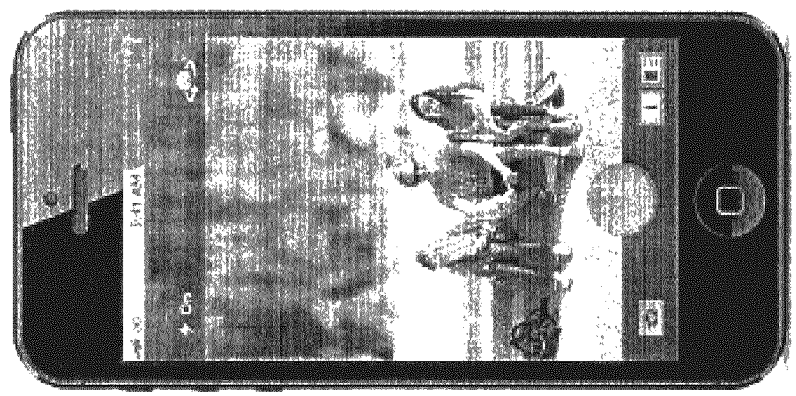
FIG. 2 is a screen shot showing a chosen photograph.

FIG. 2 is a screen shot showing a chosen photograph.

FIG. 3 is a screen shot showing making a selection to add a 3D object from the 3D object library.

Figure 4:
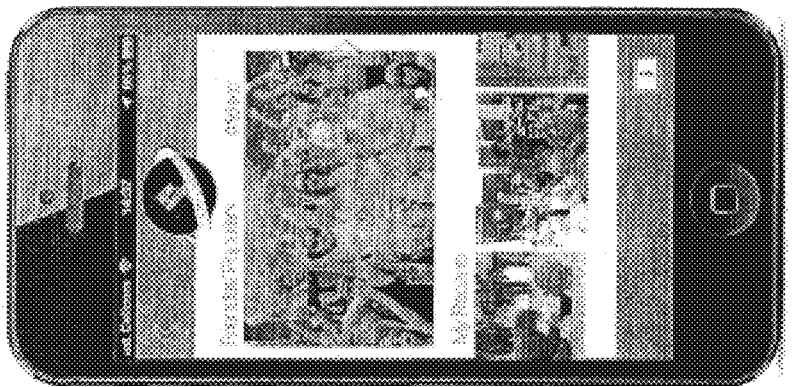
FIG. 4 is a screen shot showing friends popular photos.
Figure 7C:
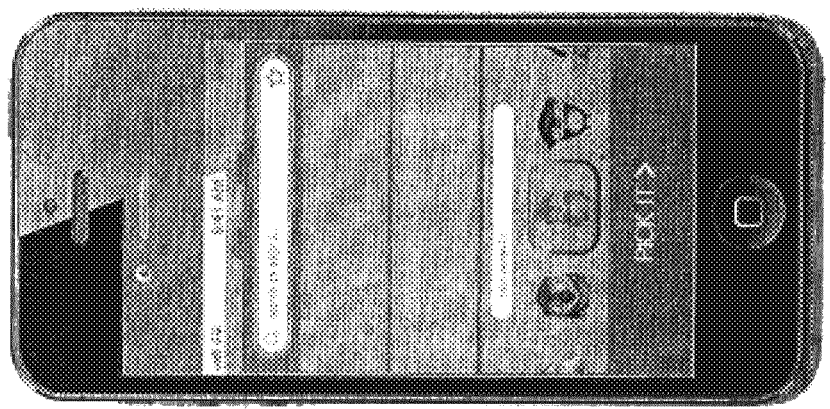
FIGS. 7A-7D are screen shots showing selection of a 3D object from a 3D object library. First a broad category, Animals, is browsed (FIG. 7A), then a sub-category, Penguin (FIG. 7B), then a particular Penguin is selected, "cute penguin" (FIG. 7C), and finally a blue cute penguin is selected (FIG. 7D).
Figure 7B:
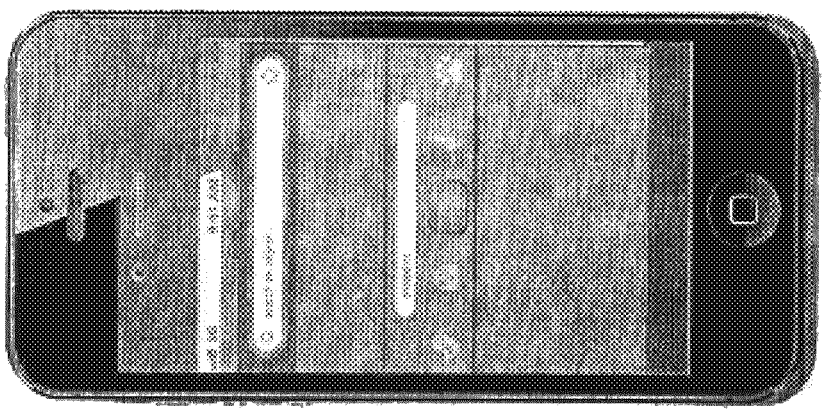
Figure 7A:
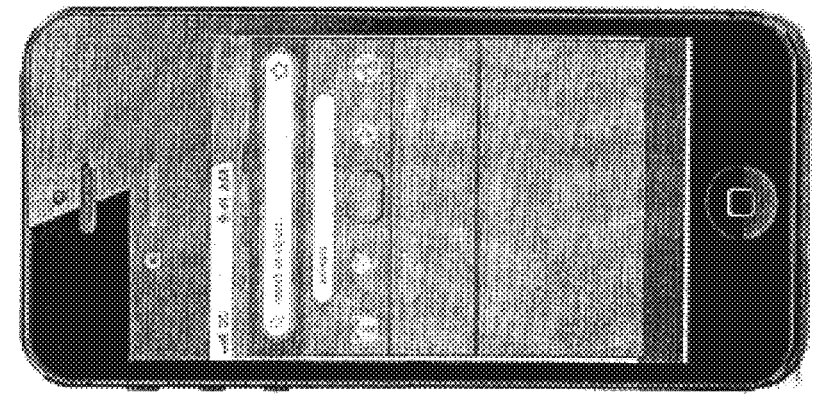

FIG. 4 is a screen shot showing friends popular photos.

Figure 5:
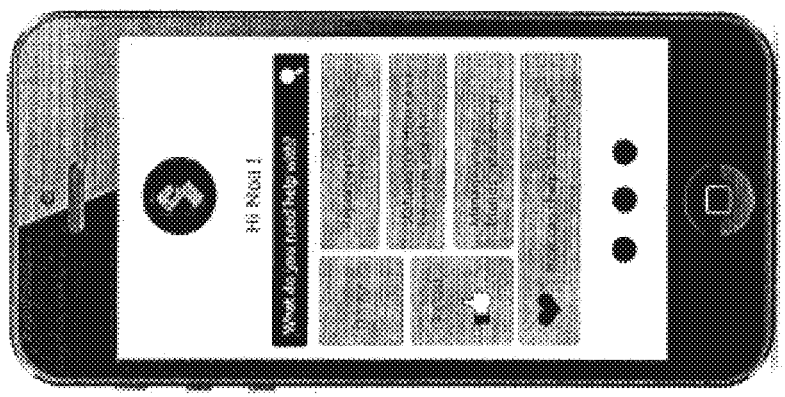
FIG. 5 is a screen shot showing a help screen.

FIG. 5 is a screen shot showing a help screen.

Figure 6:
FIG. 6 is a screen shot showing a help screen for 3D artists.

FIG. 6 is a screen shot showing a help screen for 3D artists.

Figure 7D:
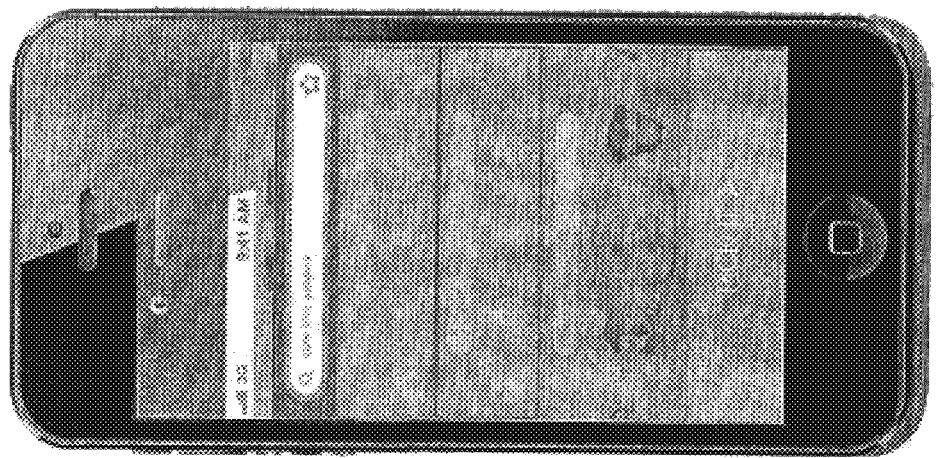

FIGS. 7A-7D are screen shots showing selection of a 3D object from a 3D object library. First a broad category, Animals, is browsed (FIG. 7A), then a sub-category, Penguin (FIG. 7B), then a particular Penguin is selected, "cute penguin" (FIG. 7C), and finally a blue cute penguin is selected (FIG. 7D).

Figure 8:
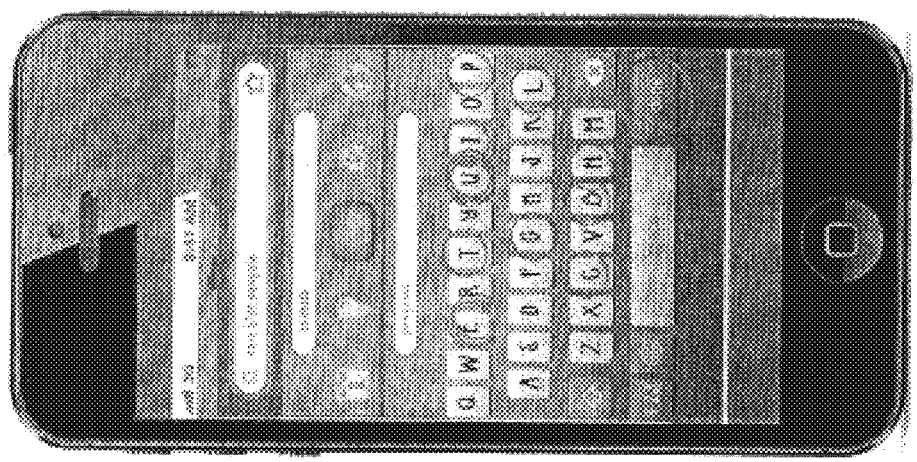
FIG. 8 is a screen shot showing selection of a 3D object from the 3D object library by typing a name (Penguin).

FIG. 8 is a screen shot showing selection of a 3D object from the 3D object library by typing a name (Penguin).

Figure 9:
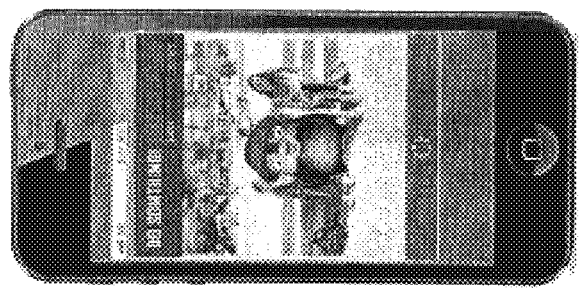
FIGS. 9A-9B are screen shots showing that by default when no action is taken by the user (FIG. 9A), the object doesn't set on any mode. On the top of the screens' navigation bar it says "Do something.

FIGS. 9A-9B are screen shots showing that by default when no action is taken by the user (FIG. 9A), the object doesn't set on any mode. On the top of the screens' navigation bar it says "Do something." (FIG. 9B).

Figure 10:
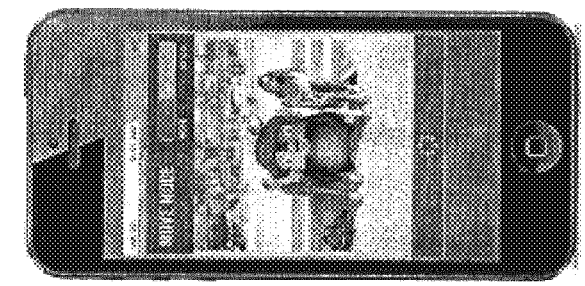
FIGS. 10A-10B are screen shots showing when the user presses the screen for a long time (FIG. 10A), it sets the object to translate mode. On the screens' navigation bar (FIG. 10B) appears a slide that automatically sets to move. It says "move mode".

FIGS. 10A-10B are screen shots showing when the user presses the screen for a long time (FIG. 10A), it sets the object to translate mode. On the screens' navigation bar (FIG. 10B) appears a slide that automatically sets to move. It says "move mode".

Figure 11:
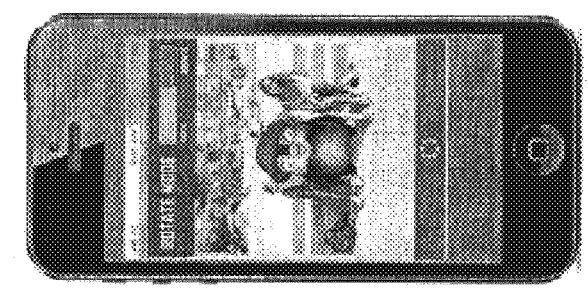
FIGS. 11A-11B are screen shots showing that when the user presses the object in short periods (like flipping through iTunes® albums, FIG. 11A), it sets the object to rotate mode. On the screens' navigation bar (FIG. 11B) the slide automatically sets to rotate. It will say "rotate mode".

FIGS. 11A-11B are screen shots showing that when the user presses the object in short periods (like flipping through iTunes® albums, FIG. 11A), it sets the object to rotate mode. On the screens' navigation bar (FIG. 11B) the slide automatically sets to rotate. It will say "rotate mode".

Figure 12:
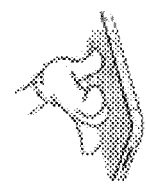
FIGS. 12A-12B are screen shots showing that when the user presses with two fingers (FIG. 12A), it sets the object to scale mode. On the top of the screens' navigation bar (FIG. 12B) it says "scale mode".
Figure 12:
Figure 12:
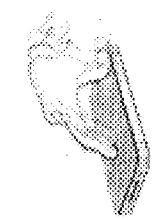
Figure 12:
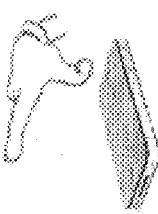
Figure 12:
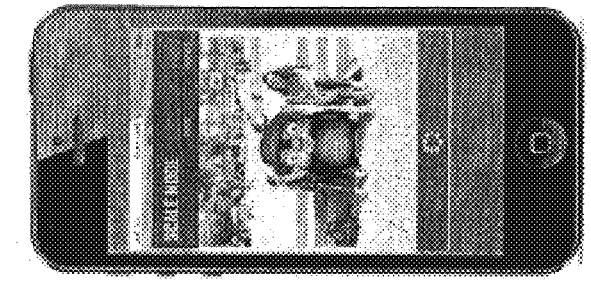

FIGS. 12A-12B are screen shots showing that when the user presses with two fingers (FIG. 12A), it sets the object to scale mode. On the top of the screens' navigation bar (FIG. 12B) it says "scale mode".

Figure 13:
FIG. 13 is a screen shot showing a slider that enables the user to shift between modes by himself. The user can move the upper slide manually. Multiple modes and widgets may be active at the same time.

FIG. 13 is a screen shot showing a slider that enables the user to shift between modes by himself. The user can move the upper slide manually. Multiple modes and widgets may be active at the same time.

Figure 14:
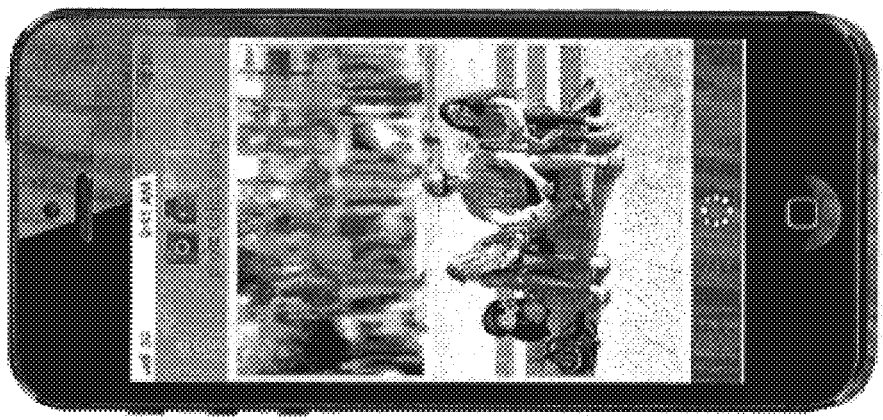
FIG. 14 is a screen shot of a user preparing to sharing a modified digital photograph.

FIG. 14 is a screen shot of a user preparing to sharing a modified digital photograph.

Figure 15:
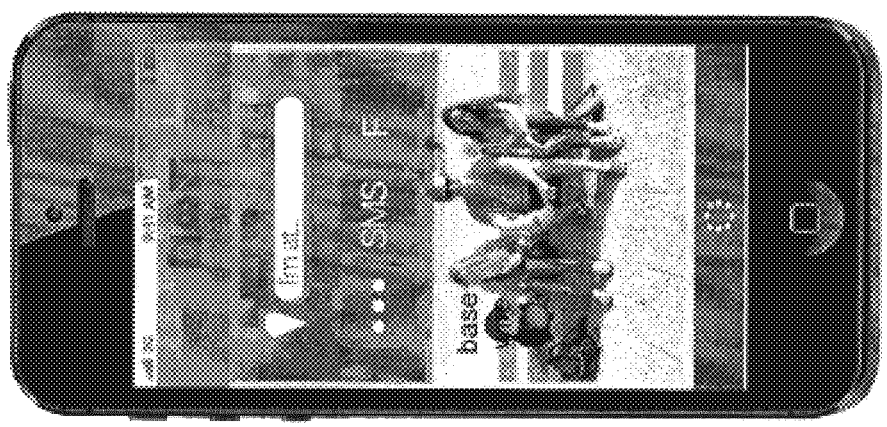
FIG. 15 is a screen shot of options to share a digital photograph via SMS, Facebook® or other options.

FIG. 15 is a screen shot of options to share a digital photograph via SMS, Facebook® or other options.

Figure 16:
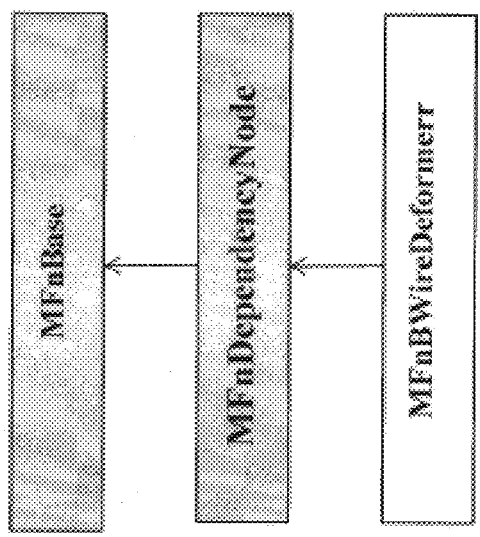
FIG. 16 is an inheritance diagram for Maya's ® MFnWireDeformer.

FIG. 16 is an inheritance diagram for Maya's® MFnWireDeformer.

FIG. 17 is a graph showing the wire deformer as completely specified by two curves of equal parametric range (a base wire and a deforming wire).

FIG. 18 displays an example of blend shapes images of a 3D object.

FIGS. 19A-19B display an example of an object of the art with deformation problems (FIG. 19A) and in contrast an object of the invention without deformation problems.

Figure 20:
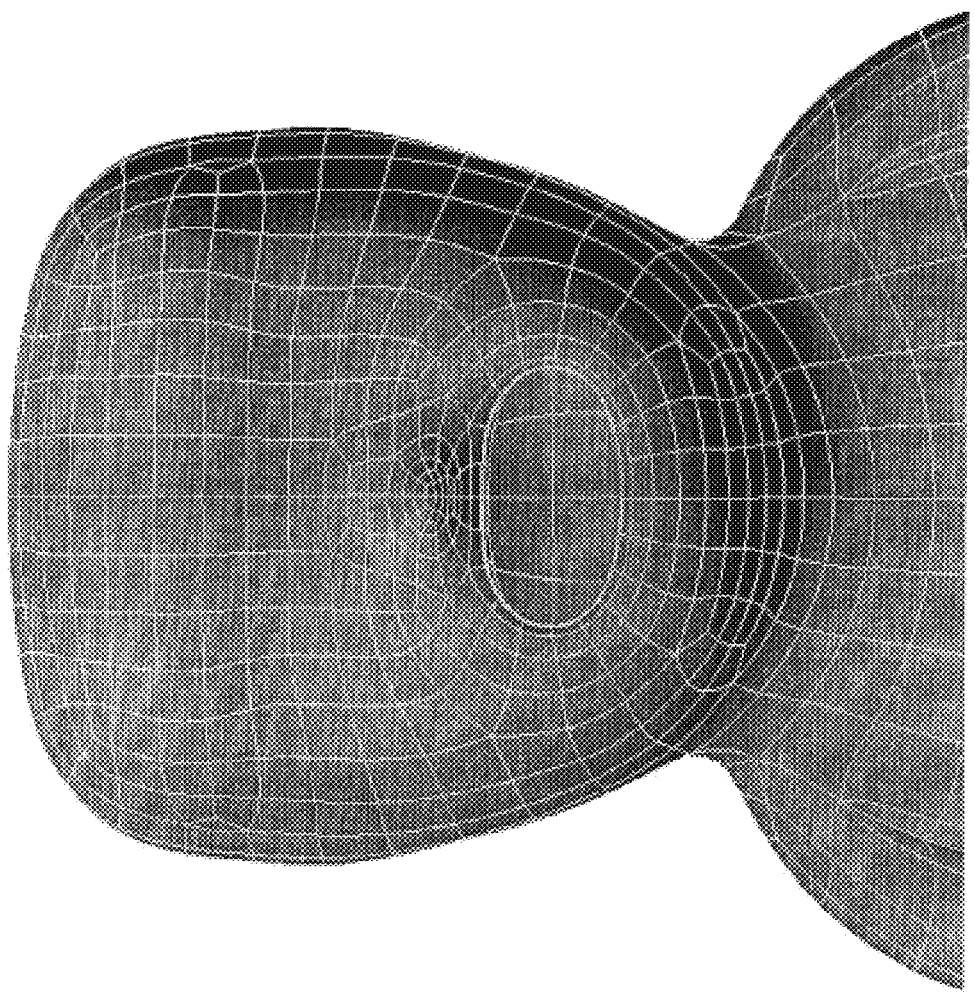
FIG. 20 shows creating a curve based on the edges that were selected on the polygonal mesh.

FIG. 20 shows creating a curve based on the edges that were selected on the polygonal mesh.

FIGS. 21A-21B describe the process for preparing a 3D object so it can be reshaped by the object manipulation module of the invention.

Creating a 3D object can be done in many ways. In one embodiment of the present invention, Maya software application by Autodesk Inc. (111 McInnis Parkway, San Rafael, Calif. 94903 USA) is used to create the 3D object. The description of FIGS. 16, 21A and 21B herein uses Autodesk Maya® as an example; Additional embodiments will be apparent to persons skilled in the relevant art(s) based on the teachings contained herein.

The setup described herein creates a control mechanism that changes the shape of a mesh, using the curve as a wire deformer. The description implements the structure (or hierarchy) of bounding and setting this complex setup. It allows changing and manipulation of the mesh. It also enables moving any main controller and/or secondary controller in any of the dimensions (it is possible to scale, translate and rotate them). If the setup contains a number of wire deformers, it is possible to move them in a non-particular order in any axis so they will still be relative to one another and to the rigged skeleton position.

The setup infrastructure is ordered in such a way that all parameters are relative to one another with respect to the joints and to the innate orientation of the mesh topology. From the point where a tweak node is present in the shape's history (tweak node is done by Maya each time the user adds a skin deformation to the shape), all component alterations will be added to the tweak node, not the shape node. Therefore, if the object is already rigged the wire deformer will be added to the tweaked node and not to the shape node. This enables attaching a wire deformer to the joint without causing tweaking problems. Also, the order of adding deformers to an object makes a difference in how they work in the scene since each deformer takes the output of the previous deformer as its input.

This set-up methodology is not based on or contains any kind of shapes produced. Unlike setting up blend shapes of the art (as shown in FIG. 17) which cause the deformation to be related and limited to the number of meshes produced in advance). Typically, graphic editors such as Autodesk Maya®, use blendshape/joint setup where the joints follow the blendshapes using custom constraints. Blendshapes are also called morph-targets or vertex level animation. However, the underlying structure of nodes and connections is all done automatically and dynamically, which is why it's impossible to connect a wire deformer to a joint that is already attached to a mesh and vice versa. FIGS. 19A and 19B illustrate an example of what usually happens when moving a skinned mesh that continues a wire deform. This unwanted result (FIG. 19A) is a consequence of not changing the hierarchy as described before. Vertex deltas are stored on the shape node and not in the tweaked node—that's why adding wire deformation to a skinned mesh isn't possible when using default settings in Autodesk Maya®. This is where the setup takes place. Generally, in order to make wire deformers relative to the joint (FIG. 19B), it is necessary to manually break the nodes in order to prevent cyclic errors.

Object setup is part of the rigging and body deformation. Rigging a 3D object is similar to turning a sculpture into an animatable puppet. A lot of concepts are shared with stop motion object animation. For instance, the skeletal structure is created and serves two functions: motion and deformation. By default, Autodesk Maya provides tools to create a skin behavior: cluster, lattice, wrap and wire deformer, blendshape and skinCluster. The most common process is to design a first pass for the body deformation with a skinCluster and to enhanced it with a pose space deformation system. In other words producing shapes and setting-up blend shapes (see FIG. 17).

The deformation order: the deformer sits on top of the deformation stack in 3D Max and after the skinCluster Node in the deformation history in Maya®. (e.g: For this reason, while working with Maya®, it is essential to create a setup that interpolates the Node order in such a way that the deformation isn't bended under the skinCluster as it's completed in the described setup).

The skincluster algorithm: its similar to the linear blend skinning or linear vector blending: A vertex is transformed by N number of joints, each influences have a weight value that controls how rigidly that vertex is attached to a bone. To have predictable result, the sum of all weights of a vertex is no more than 1.0. In a more practical standpoint the algorithm attaches rigidly the vertex to each influencing bones and the final position is then weighted.

Wire deformer function set: MFnWireDeformer is the function set for wire deformers. Wire deformers modify geometry based on its proximity to controlling wire curves. As the wire curves are modified, the parts of the geometry close to the curve will follow. The wire deformer is actually a small network of dependency nodes in the dependency graph. This function set is provided to make manipulation of the network easier. The main deformer node should be given to this function set as its object. FIG. 16 is a block diagram of the inheritance diagram for Maya's® MFnWireDeformer.

FIGS. 21A and 21B are one flowchart describing the steps for preparing an object that can be reshaped. In step 300 a 3D object is created by creating a polygonal mesh and modeling it in step 310. The polygonal mesh comprises three kinds of mesh elements: vertices, edges and faces.

The next step 320 involves centering the pivot of the 3D object and freezing the object transformation, thus positioning the object relative to the origin of the world space coordinates zero of parameters: translate (x, y, z)=(0, 0, 0), rotate (x, y, z)=(0, 0, 0) The scale (x, y, z) parameters are (1, 1, 1)

Step 330 relates to creating a skeleton and binding it to the mesh. For example, in Autodesk Maya®, using joints and "smooth skin bind" it to the mesh.

Step 340 involves creating a curve based on the edges that were selected on the polygonal mesh. This curve should be created with comparable to any of the set order of edges selected. For example, a row of edges or loop of edges (FIG. 20) in order to accomplish what it is necessary in order to draw the curve simultaneously to the edges (e.g.: in Autodesk Maya® this action is done as follow: make the selection object live by clicking on "Make the selected object live".

Example how to create a curve in Maya®: while the "Make live" icon is on, the creation tools will snap to the surface when in "Interactive Creation" mode. "Interactive creation" mode lets a user specify the width and depth of the object by clicking and dragging in his workspace and thereby the object becomes live so that the edge created on top of it will follow the continuous edges in which the user draws the curve on. The creation of the curve may be done by drawing it via the tool "EP curve tool" witch is a tool meant for drawing the curve so that it'll pass through the different points a user has created. After finishing drawing the curve, the user can close the curve. For closing the curve, the user joins the ends of a curve together to make a closed curve. In order to close the curve the user selects an open curve and chooses Edit Curves>Open/Close Curves.

In step 350, the curve is selected and converted to a wire deformer. Wire deformation works with an influence wire and a base wire. The deformation occurs according to the relative distance between the two wires. The Wire Deformer allows to modify the geometry by using a curve rather than pulling points around manually or painting them. Also, the wire deformer include control vertices (CVs) that can be moved and thereby change the influence wire.

Optionally, the wire deformer attributes may be changed. In Maya® this can be done by clicking on the Wire Deformer from the output section of the channel box. In the Channel Box some attributes can be seen that influence how this deformer affects the geometry. In the attributes, increasing the 'drop off distance' determines the proximity that the wire needs to be to the mesh in order for the influence to have an effect.

Step 360 involves creating clusters from the curve's CVs in order to control the deformation of each cluster individually (e.g.: in Autodesk Maya®: Shift-select the curve and press on "control vertex" and select each vertex and create a cluster from it. In the options window/properties of the clusters, set the clusters to be relative and choose default in the advanced tab.) A cluster deformer creates a set whose members consist of selected points (CVs, vertices, or lattice points). Since the cluster is added to the wire deformer, and since the wire deformer include CVs, the user can add a cluster to any given CVs point on the wire curve. When the user transforms the cluster, the points are transformed according to the percentages specified by the user.

Painting the wire deformer weights: this allows to use an Artisan brush (in Maya® to apply, distribute, and remove wire weights on the target object mesh. This option allows setting the wire weights in a free form manner. After doing so, the user can export the wire weights map into a 2D image file.

Step 370 involves grouping each cluster and parenting each group to the wire deformer, thus the group positioning becomes relative to the origin of the world and not relative to the local position of each cluster (e.g., in Autodesk Maya®: select each one of the clusters and make it a group out of each one. Select the group and shift-select the wire deformer and press edit>parent (shortcuts press "p" on the keyboard).

Step 380 involves creating a cluster relative to the wire deformer only. In order for the cluster to be relative to the wire, the user chooses the entire influence wire curve and then executes the command to create the cluster. In Maya®, in the cluster options window, going to the "basic" tab and setting the cluster to relative, With Relative turned on, only transformations to the cluster deformer handle itself will cause deformation effects.

The handle is a C icon that appears in the workspace once the user creates a cluster. Selecting the handle allows to move, rotate, and scale the cluster in order to create deformation effects. Generally, the effects of the cluster depend on the cluster weights that control the effect of the cluster deformer on the deformable object's points. In this case the cluster weight is related to the CVs of the wire deformer.

In the cluster options window, going to the "advanced" tab and setting the deformation order to 'after' (e.g. in Autodesk Maya®: the cluster is defined as "after". When defining the cluster as "after" Maya® places the deformer immediately after the deformable object). Defining the cluster deformer as "After" creates the cluster in intermediate deformed shape somewhere in the middle of the object's history. Therefore, this cluster influences on the cluster created earlier in the history (as described above). In addition, when the user sets the deformation order to "After", the original shape of the object will not be hidden and therefor it will force the cluster deformation to occur after the deformation of the previous clusters that has been created.

In step 390, the wire deformer is selected and a group is created from it. For example, in Autodesk Maya® go to the outliner, select the curve base wire and move it to the group, putting it under the curve.

The curves used to create deformations are called 'influence wires' or simply wires. When a user creates a 'wire deformer' another curve called 'base wire' is created for each influenced wire. The deformation effect provided by an influence wire is based on the difference between the influence wire and the base wire. Deformation order: the deformer sits on top of the deformation stack in Autodesk 3Dmax® application and after the skinCluster Node in the deformation history in Maya®.

By default, the base wire visibility is turned off in Maya®, so after creating the wire deformer, it's impossible to change the base wire position in the hierarchy. Therefore, after the mesh has a skin bind, connecting the wire deformer to the skin will cause problems. This is because from the point where there is a skin bind, it automatically creates a tweak node. This tweak node is present in a shape's history (a tweak node is automatically created by Maya® each time the user adds a skin deformation to the shape). In this case all component alterations will be added to the tweak node, not the shape node. Therefore, if the character is already rigged and skin binded, it will be unachievable to attach a wire deformer to the joint without causing tweaking problems. This is why it is necessary to group the curve based wire with the curve, as described above. As mentioned before, each deformer takes the output of the previous deformer and this is why intervention in Maya's® API is essential in this kind of matter Step 400 involves changing the pivot point of the curve. For example, in Autodesk Maya®, by pressing "insert" on the keyboard and moving the pivot point to the top of the curve, using "snap-to point tool".

Step 410 involves parent Constraining the base wire to the root joint. For example, in Autodesk Maya®, select the root joint, then go to the group of the wire and shift-select the curve based wire and then "parent constraint" it.

By parent-constraining the curve based wire to the root joint the user indirectly makes the wire relative to the movement of the mesh. This is only caused by changing the hierarchy of the curve based wire shape node and making it a child of the root joint.

The principle behind the wire deformer hierarchy:

The wire deformer is completely specified by two curves of equal parametric range (a base wire and a deforming wire), a drop-off distance value, and a drop-off function. The drop-off function is a decreasing function defined on the interval [0, 1], where the derivatives at the interval endpoints are usually zero. This work uses the drop-off function $f(x)=(1-x^2)^2$, for $x \in [0, 1]$.

Intuitively, the deformer measures the vector difference between corresponding points on the base and deforming wires. This deformation is then applied to the vertices within the drop-off distance from the base wire, weighted by the drop-off function. More specifically, consider the point P in the deformation set, and let B and D be the base and deforming wires, respectively. Additionally, let f(x) be the drop-off function and let d0 be the drop-off distance. Finally, let u be the curve parameter of the point on B closest to P, and denote this point as B(u) The wire deformer finds the corresponding point D(u) on the deforming wire and calculates the vector displacement ~r between B(u) and D(u). The final position P' of P is found by adding ~r to P, weighted by the value of f(d/d0). Here, d is the distance between P and B(u). Note that if d>d0, the weighting function is not defined. In this case, the wire deformer has no effect on the position of P. Also note that unless the base wire or the drop-off distance are modified, the calculation of the parameter u can be cached to speed up computation. To the right is an diagram that shows the effects of the wire deformer on a surface and the effects of varying the drop-off distance. This diagram illustrates the wire deformer algorithm, as described in the text. Note that ~r is shown as a bold letter 'r' above.

Next, parent the influence wire to the Root joint. For example, in Autodesk Maya®, select the influence wire, shift select the root joint and edit, parent, meaning press on "p" on the keyboard.

In step 420, the user parents the clusters that set to 'after' to the root joint. For example, in Autodesk Maya®, select the group of the cluster that was set to "after" and shift-select the root joint and edit, parent, meaning press "p" on the keyboard.

In step 430, the user connects a locator to each one of the clusters by parenting the locator shape to the cluster. For example, in Autodesk Maya®, write the following Maya Embedded Language (MEL) script: parent-add-shape 'the locator shape name', 'the cluster handle name'; and press enter to execute it.

Figure 21:
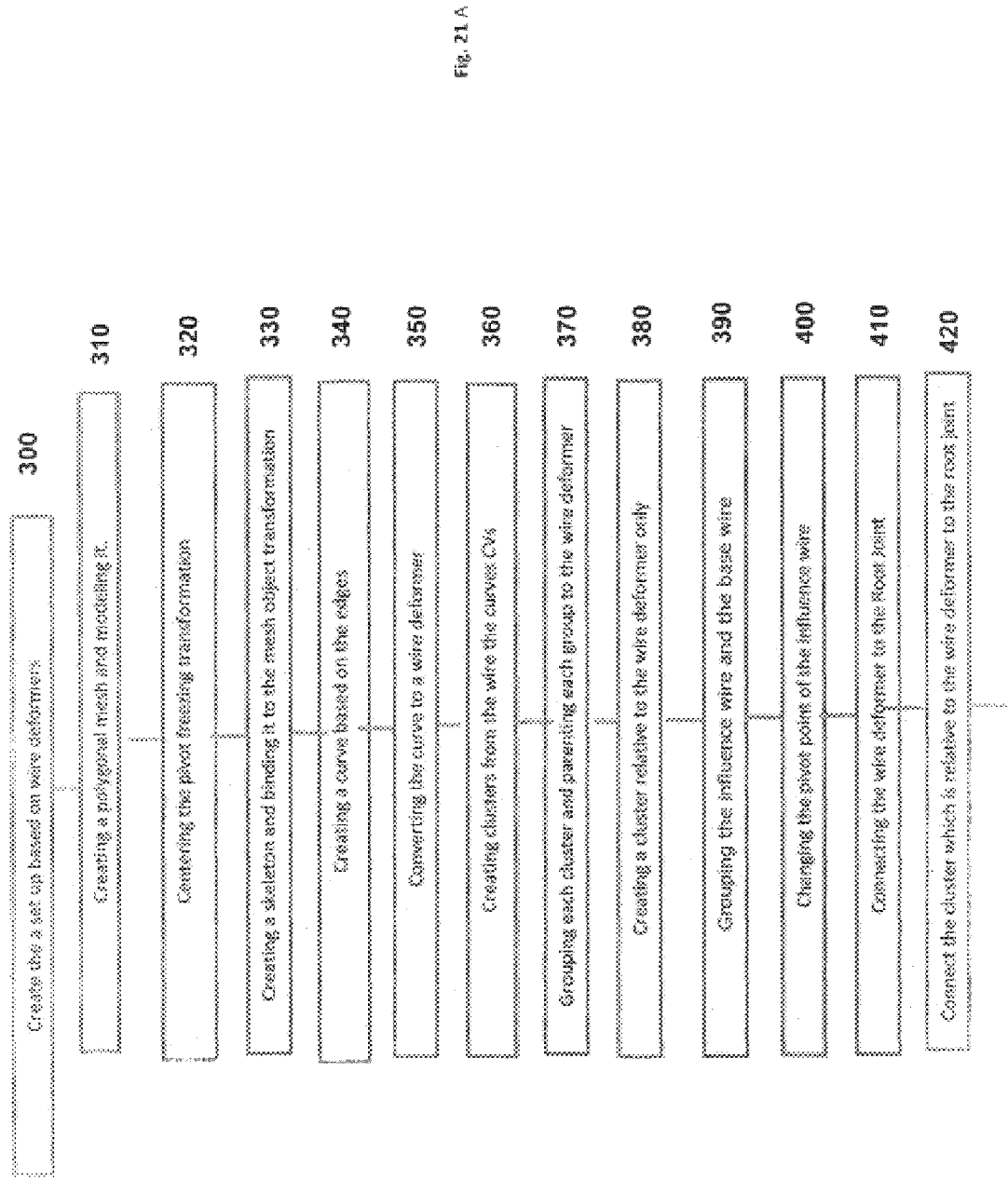
FIGS. 21A-21B describe the process for preparing a 3D object so it can be reshaped by the object manipulation module of the invention.

In step 440, the user creates a correspond menu from the setup—this menu will correspond to the wire setup and vice versa. Unlike common setups based set driven key, this menu acts similarly and derivatively to the wire setup and so there is no need to manually set driven keys (e.g.: in Autodesk Maya®: duplicate the influence wire deformer, than write the following MEL script: parent-add-shape 'the shape name of the duplicate wire deformer' 'the name of the influence wire deformer'; and press enter. Then shift select the influence wire and write the following MEL script: parent-add-shape; and press enter. than their will be a duplicated wire which is beside the influence one—group him and move it so it will be in a relative position to the duplicate wire. Then control the last wire with the duplicated wire), the result is shown in FIG. 21). The above description explains the complexity of adding new functionality into Maya®, but the process doesn't end here. In order to translate the above set-up into a multi-paradigm code system (as will be described below) it is necessary to create some new nodes that will contain the above functions. Since it is impossible to create the new nodes so that they will appear as a native code'—it can be seamlessly inserted into their DG (dependency graph)—this is combined with the ability to define unique functions, such as the 'wire deformer's new attributes' and the 'correspond menu'.

In step 450, the user exports the above setup methodology to a format that can be used in the target programming language such as C++ or any other language. It is recommended to save the files as an uncompressed text so it can be easily controlled and manipulated.

The following illustrates some embodiments of the invention with examples of how to extract an example setup and use it in an example programming language. In some embodiments, extracting the information from the text file is illustrated.

It is important to consider that different C++ compilers have incompatibilities issues between them. They also have varying degrees of ANSI C++ language conformance. Finally, not all compilers use the same standard C libraries. Using only the Maya® C++ classes and libraries with little dependency on other external libraries and advanced language features should ease any cross-platform development effort.

The steps to export a set-up are:

(1) Save the file as an uncompressed text so it is easily interpreted.

(2) Extract the information from the file. Since each area has its own particular set of data and operations, it follows logically that each area can be designed and implemented separately. In fact, each area can be defined by a distinct and separate module. Each module stores and operates on a given type of data. The modeling module, for instance, operates on the geometric and modeling data. A separate module is created for each of the tasks: modeling, animating, lighting, and rendering. Within each of these tasks, a well-defined set of functionalities is implemented. The result being a clean programming interface of each module.

The present invention teaches a 3D application that contains a deformation system. Once the user changes the color material in its static form, it could then be deformed by passing it to the deform module.

It is highly important to understand that once you included a deformation system that takes objects that were assigned with new materials and then deform them, it can be problematic since the rendering module knows how to talk only to the animation module. Therefore, the user either has to change the module and adapt it to include the new functionality or create a new module. In any event, the need to add this new functionality would mean that the animation and rendering module would need to be updated. So a simple inclusion of a new father could have a rippling effect on the entire system resulting in many revisions. The downfall of this design is that it doesn't easily let you add new functionality without making changes to all affected modules.

In general, it is preferred to save the files in a plaintext format (such as ASCII) rather than in binary or compressed formats.

(3) Convert all of the Maya® files in a given directory to OpenGL Performer binary (.pfb) format or to C++. Note: while drawing in GL ES, it is recommended to use vertex arrays. In this matter, it is important to mention that Maya® uses matrices to describe where each object should be in the scene and also the weight value each vertex contain (in the component editor)—but Maya® uses a different matrix then OpenGL—therefore it is necessary to translate this matrix data.

For example:

For rotation by an angle θ clockwise about the origin (Note that this definition of clockwise is dependent on the x axis pointing right and the y axis pointing up. In for example SVG, where the y axis points down, the below matrices must be swapped) the functional form is x'=x cos θ+y sin θ and y'=-x sin θ+y cos θ. Written in matrix form, this becomes:

$$\begin{bmatrix} x' \\ y' \end{bmatrix} = \begin{bmatrix} \cos\theta & \sin\theta \\ -\sin\theta & \cos\theta \end{bmatrix} \begin{bmatrix} x \\ y \end{bmatrix}$$

Similarly, for a rotation counter clockwise about the origin, the functional form is x'=x cos θ−y sin θ and y'=x sin θ+y cos θ and the matrix form is:

$$\begin{bmatrix} x' \\ y' \end{bmatrix} = \begin{bmatrix} \cos\theta & -\sin\theta \\ \sin\theta & \cos\theta \end{bmatrix} \begin{bmatrix} x \\ y \end{bmatrix}$$

For scaling (that is, enlarging or shrinking), we have x'=$s_x$·x and y'=$s_y$·y. The matrix form is:

$$\begin{bmatrix} x' \\ y' \end{bmatrix} = \begin{bmatrix} s_x & 0 \\ 0 & s_y \end{bmatrix} \begin{bmatrix} x \\ y \end{bmatrix}$$

When $s_x s_y$=1, then the matrix is a squeeze mapping and preserves areas in the plane.

If $s_x$ or $s_y$ is greater than 1 in absolute value, the transformation stretches the figures in the corresponding direction; if less than 1, it shrinks them in that direction. Negative values of $s_x$ or $s_y$ also flips (mirrors) the points in that direction.

Applying this sort of scaling k times is equivalent to applying a single scaling with factors $s_x^k$ and $s_y^k$.

More generally, any symmetric n×n matrix defines a scaling along two perpendicular axes (the eigenvectors of the matrix) by equal or distinct factors (the eigenvalues corresponding to those eigenvectors).

(6) Add all the bones to the skeleton otherwise <node>s of type="JOINT" and type="NODE" will be mixed in the hierarchy. If one adds every bone to the skin he will have a full tree of type="JOINT"s only. This is also the default behavior for many engine exporters.

(7) Read the <scene> node to find where the scene is instanced from and find the root joint.

(8) To read the hierarchy of the bones, the user needs to have a data structure which can hold a number of children and a parent of its own kind. One might also need to save the "SID" attribute of <node>s. Once the data structure setup is ready, the system of the invention can find the root and start reading its children and then their children and so on (recursively) and keep saving them in the data structure. At the end of the whole read process the whole data structure should be able to contain information to answer questions like, which joint is the child of whom, and who is the parent of a joint etc.

(9) Since we have added all the bones to the skin, we will only have one <skeleton> child of <instance controller>. Now this node is our root of the skeleton and everything connected to this <node> is part of the skeleton. Define the array attribute of the wire so it can be implemented as a skin cluster. Enable necessary attributes of the wire, such as rotation and scale. There are mainly two types of nodes in visual scenes, one is type="node" and the other's type="joint". The nodes of type="node" are still part of the hierarchy and it is required to use their transformation matrix when calculating the local transformation of each node. Since wire deformers aren't joints and since they don't affect any vertexes directly, it is required to import them from the index. Since some wire attributes are not saved in the index, it is required to import all the related strings. Therefore, it is required to import Maya's® MFn-WireDeformer.h as a storage folder with the string's name.

Step 460 involves creating a separate module for each of the tasks such as animation, lighting, rendering, modeling etc.

Step 470 involves specifying the attributes of each vertex, such as the weight value and the place of the object in the space.

Step 480 involves defining the array attribute of the wire so one can implement it as a skin cluster and in addition, enabling necessary attribute of the wire, such as rotation and scale.

Step 490 involves importing the wire deformer from the index.

Step 500 involves importing all of the related strings as a storage folder with the string name.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" means any one or more microprocessors, central processing units (CPUs), computing devices, microcontrollers, digital signal processors, or like devices.

The invention claimed is:

1. A computerized system comprising a processor and memory for adding three-dimensional (3D) objects to digital photographs, the system comprising:
   (i) a photograph selection software module for selecting by a processor a digital photograph stored in a digital photographs memory;
   (ii) a plurality of 3D objects in a 3D objects library, each of said 3D objects comprising:
       a) a skeleton;
       b) wire deformers attached to said skeleton;
       c) a main cluster attached to said skeleton;
       d) a plurality of secondary clusters, each secondary cluster attached to said skeleton and also attached to at least one wire deformer;
   (iii) a 3D object selection software module for selecting by a processor a 3D object from said 3D objects library;
   (iv) a merging software module for merging by a processor the selected 3D object with the selected photograph; and
   (v) a 3D object manipulation software module for selecting and modifying by a processor at least one of the 3D object's placement, size, orientation, angle, rotation, color, shape, deformation, expression, shading, lighting, erasing part of the object, applying a digital filter to the object on top of the selected photograph thus creating a modified photograph showing the selected object.

2. The system according to claim 1, wherein said system resides in a mobile telephone, a tablet computer, a laptop computer or a personal computer, a server or any combination thereof.

3. The system according to claim 1, wherein said digital photograph library resides in a mobile telephone, a tablet computer, a laptop computer, a personal computer, on a storage location accessible via the Internet or any combination thereof.

4. The system according to claim 1, wherein said 3D objects library resides in a mobile telephone, a tablet computer, a laptop computer, a personal computer, on a storage location accessible via the Internet or any combination thereof.

5. The system according to any of claims 1 to 4, wherein the modified photograph is shared with one or more social media networks.

6. The system according to of claim 1, wherein the modified photograph is first uploaded to a server and then the server shares the modified photograph with one or more social media networks.

7. A computerized method for adding 3D objects to digital photographs, the method comprising the steps of:
   (i) selecting a digital photograph stored in a digital photographs library;
   (ii) creating a plurality of 3D objects and placing them in a 3D objects library, each 3D object comprising:
       a) a skeleton;
       b) wire deformers attached to said skeleton;
       c) a main cluster attached to said skeleton;
       d) a plurality of secondary clusters, each secondary cluster attached to said skeleton and also attached to at least one wire deformer;
   (iii) selecting an object from a said 3D objects library;
   (iv) merging the selected object with the selected photograph; and
   (v) selecting and modifying at least the object's placement and size in the selected photograph thus creating a modified photograph showing the selected object.

8. The method according to claim 7, wherein said method is executed in a mobile telephone, a tablet computer, a laptop computer or a personal computer, a server or any combination thereof.

9. The method according to claim 7, wherein said digital photograph library resides in a mobile telephone, a tablet computer, a laptop computer, a personal computer, on a storage location accessible via the Internet or any combination thereof.

10. The method according to claim 7, wherein said 3D objects library resides in a mobile telephone, a tablet computer, a laptop computer, a personal computer, on a storage location accessible via the Internet or any combination thereof.

11. The method according to any of claims 7 to 10, wherein the modified photograph is shared with one or more social media networks.

12. The method according to of claim 7, wherein the modified photograph is first uploaded to a server and then the server shares the modified photograph with one or more social media networks.

\* \* \* \* \*